United States Patent
Lee et al.

(10) Patent No.: US 9,118,410 B2
(45) Date of Patent: Aug. 25, 2015

(54) LIMITED FEEDBACK METHOD AND APPARATUS FOR TWO-WAY WIRELESS RELAYING CHANNELS WITH PHYSICAL NETWORK CODING

(71) Applicant: KOREA UNIVERSITY RESEARCH AND BUSINESS FOUNDATION, Seoul (KR)

(72) Inventors: In kyu Lee, Seoul (KR); Young-Tae Kim, Seoul (KR); Kwang-Won Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 159 days.

(21) Appl. No.: 13/918,280

(22) Filed: Jun. 14, 2013

(65) Prior Publication Data

US 2014/0112152 A1    Apr. 24, 2014

(30) Foreign Application Priority Data

Oct. 23, 2012    (KR) .......................... 10-2012-0118018

(51) Int. Cl.
H04B 17/02 (2006.01)
H04W 52/58 (2009.01)
H04W 52/26 (2009.01)

(52) U.S. Cl.
CPC .............. *H04B 17/02* (2013.01); *H04W 52/58* (2013.01); *H04W 52/262* (2013.01)

(58) Field of Classification Search
CPC ........ H04B 17/02; H04B 17/00; H04L 43/02; H04W 52/58; H04W 52/262
USPC ......................................................... 370/252
See application file for complete search history.

(56) References Cited

U.S. PATENT DOCUMENTS

| | | | |
|---|---|---|---|
| 6,934,317 B1* | 8/2005 | Dent ............................. | 375/140 |
| 2012/0026954 A1* | 2/2012 | Wang et al. ................... | 370/329 |
| 2012/0275507 A1* | 11/2012 | Roman et al. ................. | 375/226 |
| 2013/0003788 A1* | 1/2013 | Marinier et al. .............. | 375/219 |
| 2013/0322376 A1* | 12/2013 | Marinier et al. .............. | 370/329 |
| 2014/0119468 A1* | 5/2014 | Huang et al. .................. | 375/267 |

OTHER PUBLICATIONS

Koike-Akino et al. "Optimized constellations for two-way wireless relaying with physical network coding".*

* cited by examiner

*Primary Examiner* — Jay P Patel
(74) *Attorney, Agent, or Firm* — Lowe Hauptman & Ham, LLP

(57) ABSTRACT

A limited feedback method and apparatus for two-way relay channels with physical network coding are disclosed. An embodiment of the invention provides a method of providing parameters as feedback to two terminals according to channel conditions by a relay for two-way communication in a two-way relaying system using PNC (physical network coding). This method includes: (a) quantizing phase difference information of two-way channels of the two terminals in consideration of whether or not a ratio of a minimum distance between constellation points is periodic according to modulation level; and (b) transmitting feedback information, which contains at least one of the phase difference information and the power control information of the two terminals, as a limited number of bits to the two terminals. Here, the number of bits for the phase difference information or the number of bits for the power control information is determined according to the modulation level.

13 Claims, 4 Drawing Sheets

-- Prior Art --

(a) Multiple access stage

FIG. 1A

-- Prior Art --

(b) Broadcast stage

LIMITED FEEDBACK METHOD AND APPARATUS FOR TWO-WAY WIRELESS RELAYING CHANNELS WITH PHYSICAL NETWORK CODING

CROSS-REFERENCE TO RELATED APPLICATIONS

This application claims the benefit of Korean Patent Application No. 10-2012-0118018, filed with the Korean Intellectual Property Office on Oct. 23, 2012, the disclosure of which is incorporated herein by reference in its entirety.

BACKGROUND

1. Technical Field

The present invention relates to a limited feedback method and apparatus for two-way relay channels with physical network coding, more particularly to a method and apparatus for providing phase information and power allocation information as feedback for two terminals with a wireless relay communicating bi-directionally.

2. Description of the Related Art

Wireless network coding has been a subject of intense research over the past several years in the area of cooperative relaying systems.

Recently, a two-way relaying system using physical network coding (PNC) was introduced.

Figure 1A:
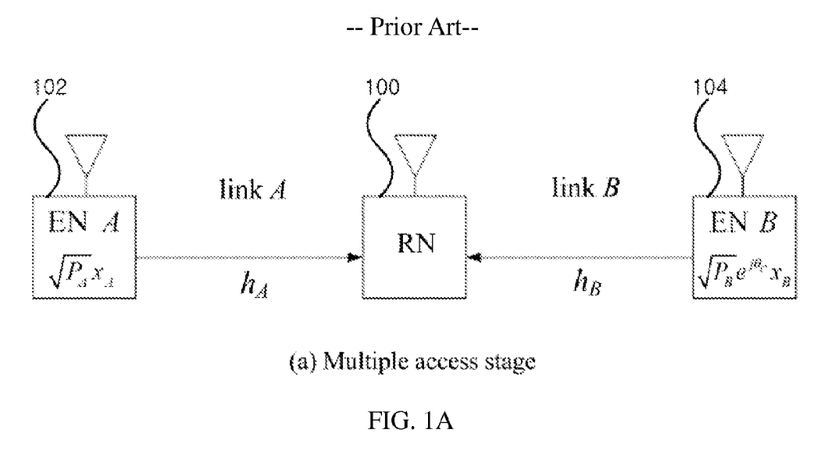
FIG. 1A and FIG. 1B illustrate a two-way relaying system for PNC.
Figure 1B:
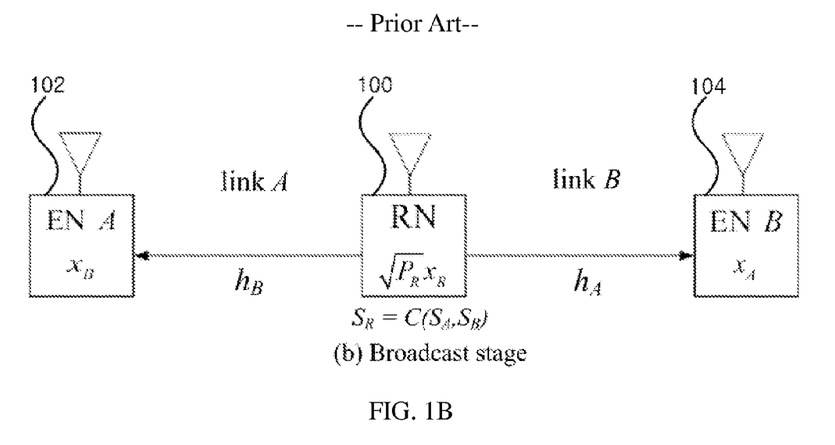

As illustrated in FIGS. 1A and 1B, the protocol may be divided into a multiple access (MA) stage, in which the relay node (relay) 100 receives data simultaneously from two end nodes (a first terminal 102 and a second terminal 104), and a broadcast (BC) stage, in which the relay 100 simultaneously broadcasts the data received from the first terminal 102 to the second terminal 104 and the data received from the second terminal 104 to the first terminal 102.

Various systems for PNC have been proposed, some of which are as shown below.

S. Katti, H. Rahul, W. Hu, D. Katabi, and M. Medard, "XORs in the air: practical wireless network coding," in Proc. Conf. Applications, Technol., Architect., and Protocols Comput. Commun., September 2006, introduces the Exclusive-OR (XOR) operation, which scheme entails a simple operation for PNC. This operation, however, suffers from performance degradation in the system due to noise from other users.

S. Zhang, S. C. Liew, and P. P. Lam, "Physical-Layer Network Coding," in Proc. ACM MOBICOM, September 2006, considers the modulo operation instead of the XOR technique, in order to improve system performance. Assuming perfect synchronization, the modulo operation for PNC can achieve almost the same bit error rate (BER) performance as one-way systems with twice as much throughput.

Y.-T. Kim, M. Park, K.-J. Lee, and I. Lee, "Linear Precoding Design based on the Minimum Distance for Two-Way MIMO Physical Network Coding Systems," in Proc. IEEE Globecom, December 2011, shows that employing the modulo operation and using precoding to make the channels of both terminals equal makes it possible to obtain optimal performance in terms of the minimum distance for a two-way relaying system.

T. Koike-Akino, P. Popovski, and V. Tarokh, "Optimized constellations for two-way wireless relaying with physical network coding," IEEE Journal on Selected Areas in Communications, vol. 27, pp. 773-787, June 2009, proposes determining network coding functions and relay mappers for all instant channel conditions to maximize the minimum distance. The paper introduces a scheme in which the network coding functions and relay mappers selected by the relay are sent to the terminals by way of a limited number of feedback bits. Although this scheme exhibits good performance compared to the XOR system, there is the drawback that every node needs to know not only the numerous network coding functions and relay mappers but also very sophisticated selection criteria subject to the channel condition.

Considering the related art, it may be preferable to use a modulo operation for PNC in a two-way relaying system, but it is needed to lower the complexity compared to the existing limited feedback scheme.

SUMMARY

An objective of the invention is to provide a limited feedback method and apparatus for physical network coding in two-way relaying channels that can provide high performance with low complexity.

To achieve the objective above, an embodiment of the invention provides a method of providing parameters as feedback to two terminals according to channel conditions by a relay for two-way communication in a two-way relaying system using PNC (physical network coding). This method includes: (a) quantizing phase difference information of two-way channels of the two terminals in consideration of whether or not a ratio of a minimum distance between constellation points is periodic according to modulation level; and (b) transmitting feedback information, which contains at least one of the phase difference information and the power control information of the two terminals, as a limited number of bits to the two terminals. Here, the number of bits for the phase difference information or the number of bits for the power control information is determined according to the modulation level.

If the modulation level is QPSK (quadrature phase shift keying), said step (a) can include reducing the number of bits for the phase difference information by one bit and generating codebook candidates within a range of $[0, \pi]$, in consideration of a period for the ratio of the minimum distance being $\pi$, and determining the phase difference information to be a codebook candidate satisfying a particular criterion from among the codebook candidates.

If the modulation level is QPSK, it is possible for the feedback information might not to include the power allocation information.

If the modulation level is 16-QAM (quadrature amplitude modulation), 1 bit of the feedback information can contain information for identifying a channel gain size of the two terminals.

The remaining bits of the feedback information can contain power control information for controlling a power of a terminal having a greater channel gain.

The power of the terminal having a greater channel gain can be determined by the formula shown below:

$$P_M = \frac{P_{M_c}}{\gamma^2(P_{M_c}, P_{m_c})}$$

where $P_M$ is the power of the terminal having a greater channel gain, $P_{MC}$ is a power constraint for the terminal having a greater channel gain, $P_{mC}$ is a power constraint for a terminal having a smaller channel gain, and $\gamma(P_M, P_m)$ is power control information.

If the power control information is between 1 and 4, the remaining bits can be selected from a codebook such that the power control information approaches 1.

The quantization model of the power control information can be expressed by the formula shown below:

$$\gamma(P_{M_C}, P_{m_C}) = \bar{\gamma}_i \text{ if } a_{i-1} \leq \gamma(P_{M_C}, P_{m_C}) < a_i$$ [Equation]

where $i=1, 2, \ldots, 2^{FB_P-1}$, and $FB_\theta$ is the number of feedback bits for $\theta_C$.

If $\gamma(P_{M_C}, P_{m_C}) \geq a_{2^{FB}P^{-1}} (a_{2^{FB}P^{-1}} \leq 4)$ or $a_0 \leq \gamma(P_{M_C}) < a_1$, then the first quantization level can be set to $\bar{\gamma}_1 = 1$.

$\bar{\gamma}_i$ and $a_i$ can be determined as values which satisfy the three conditions shown below:

1. $\bar{\gamma}_i - a_{i-1} : a_i - \bar{\gamma}_i = 2:3$ for $i = 2, 3, \ldots, 2^N$ 2. $\dfrac{5(a_1 - a_0)}{3\bar{\gamma}_1} = \dfrac{a_2 - a_1}{\bar{\gamma}_2} = \dfrac{a_3 - a_2}{\bar{\gamma}_3} = \ldots = \dfrac{a_N - a_{N-1}}{\bar{\gamma}_N}$ 3. $a_1 - a_0 : 4 - a_N = 1:2$ where $N \triangleq 2^{FB_P-1}$.

Another aspect of the invention provides a two-way communication relay configured to provide an optimal precoder as feedback to two terminals in a two-way relaying system using PNC (physical network coding). This two-way communication relay includes: a phase difference determiner unit configured to quantize phase difference information of two-way channels of the two terminals in consideration of a period for a ratio of a minimum distance between constellation points; a transmit power determiner unit configured to quantize power allocation information of the two terminals according to modulation level; and a transmitter unit configured to transmit feedback information, which contains at least one of the phase difference information and the power control information of the two terminals, as a limited number of bits to the two terminals, where the number of bits for the phase difference information or the number of bits for the power control information is determined according to the modulation level.

An embodiment of the invention makes it possible to provide feedback by which to obtain an optimal minimum distance using a smaller number of bits according to modulation level, thereby providing the advantage of higher performance with lower complexity.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings. To aid the overall understanding of the invention, like reference numerals are used for like elements regardless of the figure number.

As illustrated in FIGS. 1A and 1B, an embodiment of the invention is presented for a single-antenna relay system in which two terminals 102, 104 each having one antenna communicates through a relay 100 having one antenna.

The user terminals, end node A (first terminal 102) and end node B (second terminal 104), may transmit the symbols $x_A = M(s_A)$ and $x_B = M(s_B)$ using the M-QAM symbol mapper $M(\cdot)$, where $s_A \in \{0, 1, \ldots, M\}$ and $s_B \in \{0, 1, \ldots, M\}$. Here, it is assumed that $E\{|x_i|^2\} = 1$.

Then, the received signal of the relay 100 during the MA stage is as follows:

$$y_R = \sqrt{P_A} h_A x_A + \sqrt{P_B} e^{j\theta_C} h_B x_B + z_R$$ [Equation 1]

where $P_i$ ($i = A, B$) denotes the transmit power of terminal $i$, $\theta_C$ indicates the phase difference between the two channels, $h_i$ represents the channel between terminal $i$ and the relay, and $z_R$ represents noise at the relay.

In Equation 1, $P_i$ and $\theta_C$ are the parameters of the feedback information for the channels of the two terminals 102, 104.

The relay 100 may estimate $s_A$ and $s_B$ by maximum-likelihood (ML) detection as shown below.

$$(\hat{s}_A, \hat{s}_B) = \underset{s_A, s_B}{\arg\min} \left| y_R - \sqrt{P_A} h_A M(s_A) - \sqrt{P_B} e^{j\theta_C} h_B M(s_B) \right|^2$$ [Equation 2]

Based on the detected signals, physical network coding $C(\cdot)$ may be performed to generate the network coding symbol $s_R = C(\hat{s}_A, \hat{s}_B)$.

At the BC stage, the relay 100 may transmit the network coding symbol obtained in the MA stage as $x_R = M_R(s_R)$, using a relay mapper $M_R(\cdot)$. Then, the received signal at each terminal 102, 104 is as follows:

$$y_i = \sqrt{P_R} h_i x_R + z_i \text{ for } i = A \text{ and } B$$

where $P_R$ denotes the transmitted power of the relay.

Assuming channel reciprocity, it can be assumed that the channels of the MA and BC stages are the same.

Each terminal 102, 104 may extract the network coding symbol $s_R$ and then detect the signal transmitted by the other terminal by using its own symbol $s_i$ and the mapper $C(\cdot)$.

In the BC stage, since it is optimal for the relay 100 to use full power, $P_R = P_{R_C}$ is used. Here, $P_{R_C}$ represents the power constraint of the relay.

However, in the MA stage, the transmit powers $P_A$ and $P_B$ of the respective terminals 102, 104 and the phase difference $\theta_C$ may have to be adjusted according to channel realizations.

This is because these may influence the minimum distance between the constellation points of $s_A$ and $s_B$, which determines the performance of the MA stage.

Here, the minimum distance can be expressed as follows:

$$d_{min}^2 \triangleq \min_{C(s_A, s_B) \neq C(s'_A, s'_B)} d^2(s_A, s'_A, s_B, s'_B) \quad \text{[Equation 3]}$$

where $$d^2(s_A, s'_A, s_B, s'_B) = \left|\sqrt{P_A}\, h_A \Delta x_A + \sqrt{P_B}\, e^{j\theta_C} h_B \Delta x_B\right|^2 / \sigma^2$$

and $$\Delta x_i = |M(s_i) - M(s'_i)|.$$

Since the minimum distance of the MA stage cannot exceed either that of link A or B, the following optimal value can be defined:

$$d_{min}^2 \leq \min\left(\frac{P_A |h_A|^2 \Delta_{min}^2}{\sigma^2}, \frac{P_B |h_B|^2 \Delta_{min}^2}{\sigma^2}\right) \triangleq d_{min,opt}^2 \quad \text{[Equation 4]}$$

where $\Delta_{min} \triangleq \min \Delta x_A = \min \Delta x_B$.

Y.-T. Kim et al. proved that choosing a modulo operation for the mapper $C(\cdot)$ and adjusting the power of each terminal and the phase can achieve the optimal performance which approaches the upper bound of the minimum distance shown in Equation 4. Defining the inphase and the quadrature of symbol $s_i$ as $s_{iI}$ and $s_{iQ}$, respectively, the network coding symbol $s_R$ may be obtained by the modulo operation as follows:

$$s_{Rk} = C_k(s_{Ak}, s_{Bk}) \quad \text{[Equation 5]}$$
$$= (s_{Ak} + s_{Bk}) \bmod \sqrt{M} \quad \text{for } k = I \text{ and } Q$$

where $C_k(\cdot)$ represents the mapper for the inphase and the quadrature, $(\cdot) \bmod \sqrt{M}$ indicates the modulo operation of size $\sqrt{M}$. The modulo operation may generate the inphase and the quadrature separately.

Here, the optimal values for transmit power $P_A$ and $P_B$ and phase difference $\theta_C$ in terms of the minimum distance can be expressed as follows:

$$P_A = P_{A_C},\ P_B = \frac{|h_A|^2}{|h_B|^2} P_{A_C} \text{ if } P_{A_C}|h_A|^2 \leq P_{B_C}|h_B|^2 \quad \text{[Equation 6]}$$

$$P_A = \frac{|h_B|^2}{|h_A|^2} P_{B_C},\ P_B = P_{B_C} \text{ if } P_{A_C}|h_A|^2 > P_{B_C}|h_B|^2$$

$$\theta_C = \theta_A - \theta_B$$

where $\theta_A$ and $\theta_B$ are denoted as the channel phase of each terminal. With Equation 6, the optimal value for the minimum distance may be obtained by $$d_{min,opt}^2 = \frac{\Delta_{min}^2}{\sigma^2} \min(P_A |h_A|^2, P_B |h_B|^2),$$

and the two link channels become the same.

In order to obtain the optimal minimum distance, accurate values of the transmit powers $P_A$ and $P_B$ and the phase difference $\theta_C$ may be required as feedback. However, providing such information to the terminals in a limited number of bits, as is the case in an actual environment, may lead to degraded performance.

Thus, to resolve this issue, an embodiment of the invention provides an efficient feedback method for providing the transmit powers $P_A$ and $P_B$ and the phase difference $\theta_C$ for the cases in which the modulation level is QPSK and 16-QAM, based on Equation 6, which yields optimal values assuming that the modulo operation in Equation 5 is adopted.

Figure 2:
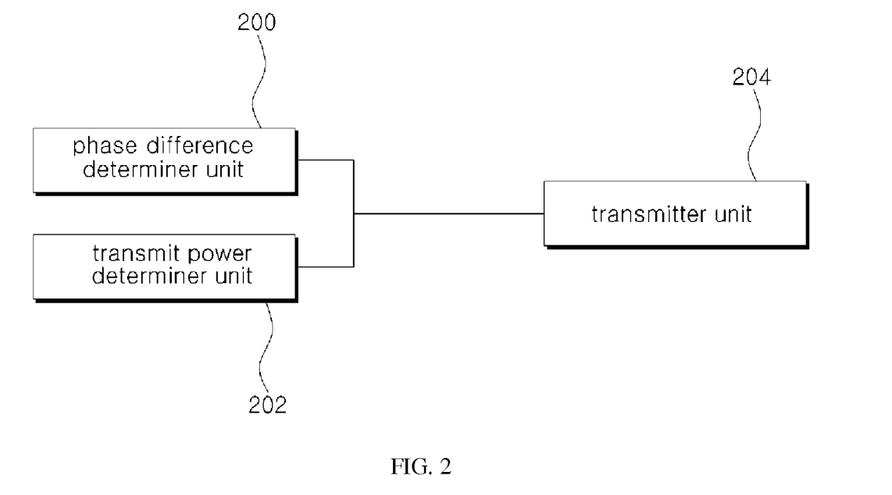
FIG. 2 is a block diagram of a relay according to an embodiment of the invention.

FIG. 2 is a block diagram illustrating the components of a relay according to an embodiment of the invention.

As illustrated in FIG. 2, a relay 100 according to an embodiment of the invention can include a phase difference determiner unit 200, a transmit power determiner unit 202, and a transmitter unit 204.

The phase difference determiner unit 200 may quantize the phase difference information of the channels of the two terminals 102, 104 communicating bi-directionally, in consideration of whether or not the ratio of the minimum distance between constellation points is periodic, according to modulation level.

To be more specific, if the modulation level is QPSK, then the ratio of the minimum distance has a period of $\pi$, so that the phase difference determiner unit 200 may reduce one bit to design codebook candidates within the range of $[0, \pi]$ and determine one of the designed codebook candidates as the phase difference information.

If the modulation level is 16-QAM, the ratio of the minimum distance is not periodic, so that the codebook candidates may be uniformly quantized within $[0, \pi]$, from which the phase difference information may be determined.

The transmit power determiner unit 202 may determine the transmit power allocation information for the two terminals performing two-way communication.

Similar to the case of phase difference, the transmit power determiner unit 202 can determine the power allocation information differently according to the modulation level.

For example, if the modulation level is QPSK, it may be preferable to have both terminals transmitting with full power, so that there may be no separate power allocation.

However, in the case of 16-QAM, the transmit power determiner unit 202 may determine the power allocation information in consideration of the channel gains of the two terminals.

To be more specific, if the modulation level is 16-QAM, then the transmit power determiner unit 202 may include information for identifying the channel gain sizes of the two terminals in 1 bit from among the bits for the power allocation information. The remaining bits may include power control information for controlling the transmit power of the terminal having the greater channel gain.

The phase difference information and power allocation information determined as above may be transmitted to the two terminals in limited bit numbers.

Thus, according to an embodiment of the invention, the information for optimizing the minimum distance can be fed back with a small number of bits according to modulation level.

That is, if the modulation level is QPSK, the bits for the phase difference can be reduced by one bit, and if the modulation level is 16-QAM, one bit can be allocated for the information identifying the channel gain size, while the rest can be used for controlling the transmit power. Thus, it is possible to improve performance with the given number of bits.

A more detailed description is provided below of the procedures associated with phase difference and power allocation.

(1) QPSK (Quadrature Phase Shift Keying)

First, for the feedback information of the phase difference $\theta_C$, a uniform quantization within $[0, 2\pi]$ may be needed.

However, it can be seen that the minimum distance ratio $R \triangleq d_{min}/d_{min,opt}$ for $\theta_C$ has a period of $\pi$.

Therefore, according to an embodiment of the invention, one bit may be reduced, and the codebook may be designed within the range of $[0, \pi]$ as follows:

$$CB_\theta = \left\{0, \frac{\pi}{2^{FB_\theta}}, \ldots, (2^{FB_\theta}-1)\frac{\pi}{2^{FB_\theta}}\right\}$$

where $FB_\theta$ is the number of feedback bits for $\theta_C$. Then, the feedback information for $\theta_C$ may be determined from among the codebook candidates as the one satisfying the equation shown below:

$$\hat{\theta}_C = \arg\min_{c_i \in CB_\theta} \left|\left\{\left(\theta_A - \theta_B + \frac{\pi}{2^{FB_\theta+1}}\right)\bmod \pi\right\} - \frac{\pi}{2^{FB_\theta+1}} - c_i\right|$$

Next, there does not have to be any separate allocation of feedback information related to transmit powers $P_A$ and $P_B$, because in QPSK, transmitting at full power ($P_A = P_{A_C}$, $P_B = P_{B_C}$) also maximizes the minimum distance as was already proven.

(2) 16-QAM (Quadrature Amplitude Modulation)

For the feedback information of $\theta_C$ in 16-QAM, the ratio of minimum distance is not periodic, in contrast to the case of QPSK. Therefore, the codebook for 16-QAM may be uniformly quantized in $[0, 2\pi]$ as shown below:

$$CB_\theta = \left\{0, \frac{2\pi}{2^{FB_\theta}}, \ldots, (2^{FB_\theta}-1)\frac{2\pi}{2^{FB_\theta}}\right\}$$

The phase difference information fed back based on the above codebook may be as follows:

$$\hat{\theta}_C = \arg\min_{c_i \in CB_\theta} |\theta_A - \theta_B - c_i|$$

Next, a description is provided of the quantization procedure for transmit power allocation.

Assuming first that the phase difference $\theta_C$ was accurately transferred, the minimum distance can be expressed as follows:

$$d_{min}^2 = \min_{C(s_M, s_m) \neq C(s'_M, s'_m)} \frac{P_m |h_m|^2}{\sigma^2} |\Delta x_m + \gamma(P_M, P_m)\Delta x_M|^2 \quad \text{[Equation 7]}$$

where the index of the terminal having the greater channel gain is represented as $M \triangleq \arg\max_{i \in \{A,B\}} \sqrt{P_{iC}}|h_i|$, the index of the terminal having the smaller channel gain is represented as $m \triangleq \arg\min_{i \in \{A,B\}} \sqrt{P_{iC}}|h_i|$, and the power control information is defined as $\gamma(P_M, P_m) \triangleq \sqrt{P_M}|h_M|/\sqrt{P_m}|h_m|$.

In order to satisfy Equation 7, the terminal having the smaller channel gain may use maximum power ($P_m = P_{m_C}$). On the other hand, for the terminal having the greater channel gain, the transmit power may be reduced as follows:

$$P_M = \frac{P_{M_C}}{\gamma^2(P_{M_C}, P_{m_C})}$$

where $\gamma(P_M, P_m)$ represents the power control information. If the power control information is 1, then the two channels become the same. Thus, in the limited feedback bit number $FB_P$ for the transmit power information, 1 bit may be used to indicate which of the terminals has the smaller channel gain. As described above, the terminal having the smaller channel gain may perform transmission at maximum power. The remaining bits may be selected from the codebook such that $\gamma(P_M, P_m)$ approaches 1.

A description is provided below of the design of an efficient codebook for providing the feedback of $\gamma(P_M, P_m)$.

If $\gamma(P_M, P_m)$ is equal to 1 or is greater than or equal to 4, full power transmission may be employed by both of the two terminals 102, 104 to obtain the maximum value for the minimum distance.

If $\gamma(P_M, P_m)$ is between 1 and 4, then the quantization model for $\gamma(P_M, P_m)$ can be expressed by the following equation:

$$\gamma(P_{M_C}, P_{m_C}) = \bar{\gamma}_i \text{ if } a_{i-1} \leq \gamma(P_{M_C}, P_{m_C}) < a_i \quad \text{[Equation 8]}$$

for $i = 1, 2, \ldots, 2^{FB_P-1}$. Here, 1 bit was used for determining the node M (the terminal having the greater channel gain) and m (the terminal having the smaller channel gain).

As described above, when $\gamma(P_{M_C}, P_{m_C}) \geq a_{2^{FB_P-1}} (a_{2^{FB_P-1}} \leq 4)$ or $a_0 \leq \gamma(P_{M_C}) \leq a_1$, the first quantization level may be set to $\bar{\gamma}_1 = 1$.

Next, $\bar{\gamma}_i$ and $a_i$ may be determined to maximize the worst minimum distance ratio.

According to an embodiment of the invention, $\bar{\gamma}_i$ and $a_i$ may be determined such that the following three conditions are satisfied:

1. $\bar{\gamma}_i - a_{i-1} : a_i - \bar{\gamma}_i = 2:3$ for $i = 2, 3, \ldots, 2^N$ 2. $\frac{5(a_1 - a_0)}{3\bar{\gamma}_1} = \frac{a_2 - a_1}{\bar{\gamma}_2} = \frac{a_3 - a_2}{\bar{\gamma}_3} = \ldots = \frac{a_N - a_{N-1}}{\bar{\gamma}_N}$ 3. $a_1 - a_0 : 4 - a_N = 1:2$ where $N \triangleq 2^{FB_P-1}$. The values of $\bar{\gamma}_i$ and $a_i$ satisfying the three conditions above can be obtained by computing the N number of equations shown below:

$$k_1(3k_1 + 2k_2 + 1) - k_2 = 0$$

$$k_1(3k_1 + 5k_2 + 2k_3 + 1) - k_3 = 0$$

$$\vdots$$

$$k_1\left(3k_1 + 5\sum_{i=2}^{N-1} k_i + 2k_N + 1\right) - k_N = 0$$

$$9k_1 + \sum_{i=2}^{N} k_i - 3 = 0$$

where $k_1 \triangleq \frac{a_1 - 1}{3}$ and $k_i \triangleq \frac{a_i - a_{i-1}}{5}$.

Since there are N equations and N variables, $k_i$ can be calculated by the Newton Method, and $\bar{\gamma}_i$ and $a_i$ can be ultimately computed using $k_i$. Thus, by using Equation 8, it is possible to feedback the transmit power allocation of each terminal.

Figure 3:
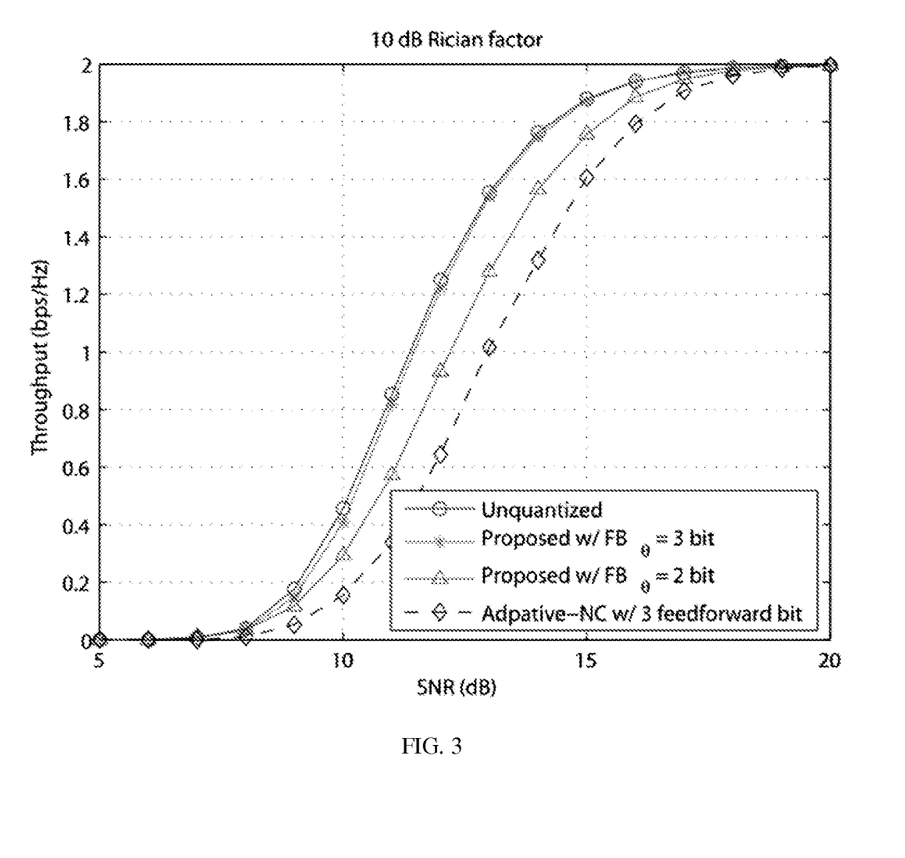
FIG. 3 represents the throughput of PNC systems using QPSK in Nakagami-Rice fading channels.

FIG. 3 represents the throughput of PNC systems using QPSK in Nakagami-Rice fading channels. Compared to the case of perfect feedback information, it can be seen that the case of using 3 feedforward bits yields almost the same performance results. Also, even when two bits are used according to an embodiment of the invention, a higher performance is obtained compared to the existing adaptive-NC method [T. Koike-Akino] that uses 3 bits.

Figure 4:
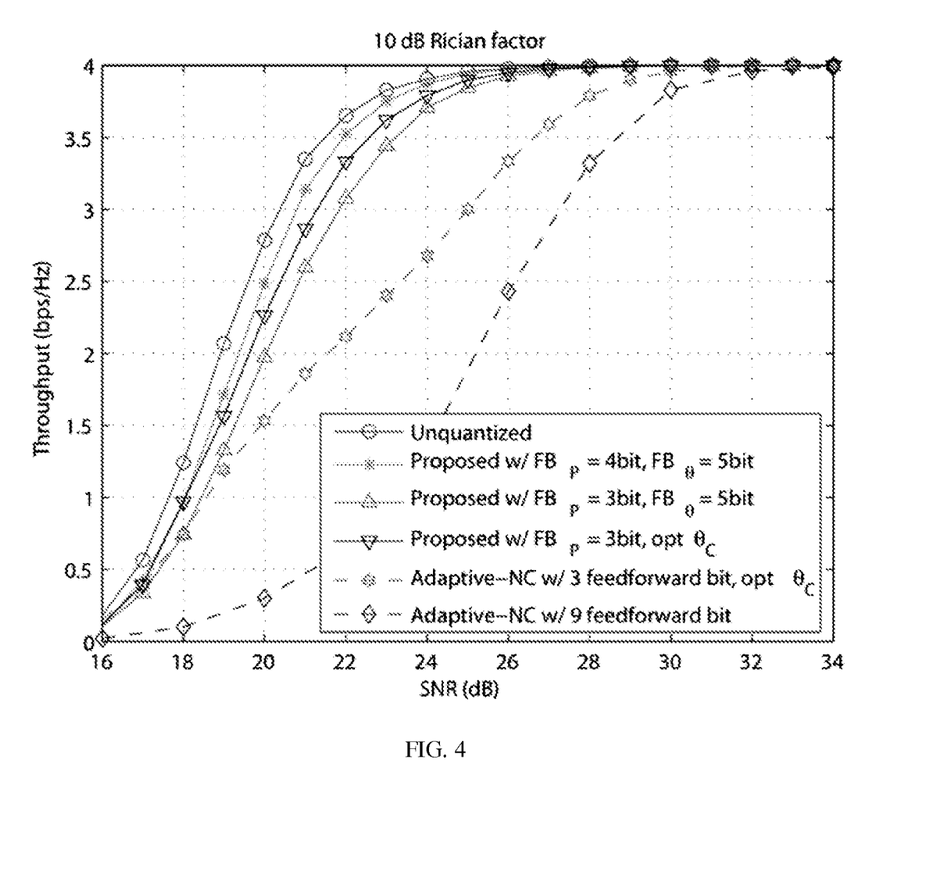
FIG. 4 represents the throughput of PNC systems using 16-QAM in Nakagami-Rice fading channels.

FIG. 4 represents the throughput of PNC systems using 16-QAM in Nakagami-Rice fading channels. For comparison, the existing adaptive-NC method using 9 feedforward bits was selected. A method according to an embodiment of the invention used 5 bits for phase and 4 bits for power control. It can be seen that the method according to an embodiment of the invention yields much higher performance even with a reduced number of bits. Also, whereas the adaptive-NC method uses 300 network codes and 15 QAM constellations at the relay, the method according to an embodiment of the invention adopts just a modulo operation and 16-QAM, and thus requires much lower complexity.

The embodiments of the invention described above are disclosed herein for illustrative purposes only. It is to be appreciated that various modifications, alterations, and additions can be made by those of ordinary skill in the art without departing from the technical spirit and scope of the invention, and that such modifications, alterations, and additions are encompassed by the scope of claims set forth below.

What is claimed is:

1. A method of providing parameters as feedback to two terminals according to channel conditions by a relay for two-way communication in a two-way relaying system using PNC (physical network coding), the method comprising:
   (a) quantizing phase difference information of two-way channels of the two terminals in consideration of whether or not a ratio of a minimum distance between constellation points is periodic according to modulation level; and
   (b) transmitting feedback information as a limited number of bits to the two terminals, the feedback information containing at least one of the phase difference information and the power control information of the two terminals,
   wherein a number of bits for the phase difference information or a number of bits for the power control information is determined according to the modulation level, and
   wherein, if the modulation level is QPSK (quadrature phase shift keying), said step (a) comprises:
   reducing the number of bits for the phase difference information by one bit and generating codebook candidates within a range of $[0, \pi]$ in consideration of a period for the ratio of the minimum distance being $\pi$, and determining the phase difference information to be a codebook candidate satisfying a particular criterion from among the codebook candidates.

2. The feedback method of claim 1, wherein, if the modulation level is QPSK, the feedback information does not include the power allocation information.

3. The feedback method of claim 1, wherein, if the modulation level is 16-QAM (quadrature amplitude modulation), 1 bit of the feedback information contains information for identifying a channel gain size of the two terminals.

4. The feedback method of claim 3, wherein remaining bits of the feedback information contain power control information for controlling a power of a terminal having a greater channel gain.

5. The feedback method of claim 4, wherein the power of the terminal having a greater channel gain is determined by a formula shown below:

$$P_M = \frac{P_{M_C}}{\gamma^2(P_{M_C}, P_{m_C})}$$

where $P_M$ is the power of the terminal having a greater channel gain, $P_{M_C}$ is a power constraint for the terminal having a greater channel gain, $P_{m_C}$ is a power constraint for a terminal having a smaller channel gain, and $\gamma(P_M, P_m)$ is power control information.

6. The feedback method of claim 5, wherein the remaining bits are selected from a codebook such that the power control information approaches 1 if the power control information is between 1 and 4.

7. The feedback method of claim 5, wherein a quantization model of the power control information is expressed by a formula shown below:

$$\gamma(P_{M_C} P_{m_C}) = \bar{\gamma}_i \text{ if } a_{i-1} \leq \gamma(P_{M_C} P_{m_C}) < a_i$$

where $i = 1, 2, \ldots, 2^{FB_P - 1}$, and $FB_\theta$ is the number of feedback bits for $\theta_C$.

8. The feedback method of claim 7, wherein a first quantization level is set to $\gamma_1 = 1$ if $\gamma(P_{M_C}, P_{m_C}) \geq a_{2^{FB_P - 1}} (a_{2^{FB_P - 1}} \leq 4)$ or $a_0 \leq \gamma(P_{M_C}) \leq a_1$.

9. The feedback method of claim 8, wherein $\bar{\gamma}_i$ and $a_i$ are determined as values which satisfy three conditions shown below:

1. $\bar{\gamma}_i - a_{i-1} : a_i - \bar{\gamma}_i = 2:3$ for $i = 2, 3, \ldots, 2^N$ 2. $\dfrac{5(a_1 - a_0)}{3\bar{\gamma}_1} = \dfrac{a_2 - a_1}{\bar{\gamma}_2} = \dfrac{a_3 - a_2}{\bar{\gamma}_3} = \ldots = \dfrac{a_N - a_{N-1}}{\bar{\gamma}_N}$ 3. $a_1 - a_0 : 4 - a_N = 1:2$ where $N \triangleq 2^{FB_P - 1}$.

10. A two-way communication relay configured to provide an optimal precoder as feedback to two terminals in a two-way relaying system using PNC (physical network coding), the two-way communication relay comprising:
   a phase difference determiner unit configured to quantize phase difference information of two-way channels of the two terminals in consideration of a period for a ratio of a minimum distance between constellation points;
   a transmit power determiner unit configured to quantize power allocation information of the two terminals according to modulation level; and
   a transmitter unit configured to transmit feedback information as a limited number of bits to the two terminals, the feedback information containing at least one of the phase difference information and the power control information of the two terminals,
   wherein a number of bits for the phase difference information or a number of bits for the power control information is determined according to the modulation level, and
   wherein, if the modulation level is QPSK (quadrature phase shift keying), the phase difference determiner unit reduces the number of bits for the phase difference information by one bit and generates codebook candidates within a range of [0, π], in consideration of a period for the ratio of the minimum distance being π, and determines the phase difference information to be a codebook candidate satisfying a particular criterion from among the codebook candidates.

11. The two-way communication relay of claim 10, wherein, if the modulation level is 16-QAM (quadrature amplitude modulation), 1 bit of the feedback information contains information for identifying a channel gain size of the two terminals.

12. The two-way communication relay of claim 11, wherein remaining bits of the feedback information contain power control information for controlling a power of a first terminal having a greater channel gain.

13. The two-way communication relay of claim 12, wherein the power of the terminal having a greater channel gain is determined by a formula shown below:

$$P_M = \frac{P_{M_C}}{\gamma^2(P_{M_C}, P_{m_c})}$$

where $P_M$ is the power of the terminal having a greater channel gain, $P_{M_C}$ is a power constraint for the terminal having a greater channel gain, $P_{m_C}$ is a power constraint for a terminal having a smaller channel gain, and $\gamma(P_M, P_m)$ is power control information.

* * * * *